(12) United States Patent
Cotilletta

(10) Patent No.: US 6,739,936 B1
(45) Date of Patent: May 25, 2004

(54) TOY SUPPORT APPARATUS

(76) Inventor: Anthony Cotilletta, 58 Edgewood Dr., New Hyde Park, NY (US) 11040

( * ) Notice: Subject to any disclaimer, the term of this patent is extended or adjusted under 35 U.S.C. 154(b) by 0 days.

(21) Appl. No.: 10/669,573

(22) Filed: Sep. 25, 2003

(51) Int. Cl.[7] .................................................. A47F 5/00
(52) U.S. Cl. ..................... 446/73; 248/125.8; 248/219.2
(58) Field of Search ............................. 248/188, 176.1, 248/176.3, 163.1, 121, 125.8, 125.9, 207, 218.4, 219.2; 446/71, 72, 73, 268

(56) References Cited

U.S. PATENT DOCUMENTS

| | | | |
|---|---|---|---|
| 248,409 A | 11/1977 | Venture | |
| 4,706,915 A | 11/1987 | Cindric et al. | |
| 5,549,499 A | 8/1996 | Foskey et al. | |
| 5,551,656 A | * 9/1996 | De Lozada et al. | 248/176.1 |
| 6,209,829 B1 | 4/2001 | Yu | |
| 6,264,525 B1 | * 7/2001 | Guschlbauer | 446/268 |
| 6,390,424 B1 | 5/2002 | Kidushim et al. | |

* cited by examiner

*Primary Examiner*—Jacob K. Ackun, Jr.

(57) ABSTRACT

A toy support apparatus includes a base support having a top surface, a bottom surface, and a peripheral edge extending between the top and bottom surfaces. The top surface has a plurality of wells extending therein. Each of a plurality of vertical supports has a female coupler end and a male coupler end. Each of the male coupler ends may selectively be mated with one of the female coupler ends or one of the wells in the base support such that a support structure is defined extending upwardly from the base support. A plurality of gripping members may be used for selectively gripping a toy. Each of the plurality of gripping members has a male coupler attached thereto.

10 Claims, 6 Drawing Sheets

TOY SUPPORT APPARATUS

BACKGROUND OF THE INVENTION

1. Field of the Invention

The present invention relates to doll and toy support devices and more particularly pertains to a new doll and toy support device for supporting a toy and its accessories.

2. Description of the Prior Art

The use of doll and toy support devices is known in the prior art. U.S. Pat. No. 5,549,499 describes a device including a telescoping pole and clamping arms for holding a doll in a generally vertical orientation. Another type of doll and toy support device is U.S. Pat. No. 4,706,915 which again includes a pole but also includes a tilting means for tilting the doll to a selected angle. U.S. Pat. No. 5,551,656 depicts yet another type of doll support apparatus which includes a rigid pole having a plurality openings extending therethrough for the receiving of support arms of the device.

While these devices fulfill their respective, particular objectives and requirements, the need remains for a device that supports a multiple number of toys and their accessories and allows for a variation in size of the toys to be supported. Additionally, it would be a great benefit if the device also included the ability to selectively position the accessories in a spaced relationship with respect to the toy.

SUMMARY OF THE INVENTION

The present invention meets the needs presented above by includes a base support having a plurality of wells therein so that vertical supports of the present invention may selectively be positioned on the base support.

Another object of the present invention is to provide a new doll and toy support device that includes vertical supports that are modular in nature so that they may be selectively added together to form a support structure to hold a toy in a generally vertical orientation.

To this end, the present invention generally comprises a base support having a top surface, a bottom surface, and a peripheral edge extending between the top and bottom surfaces. The top surface has a plurality of wells extending therein. Each of a plurality of vertical supports has a female coupler end and a male coupler end. Each of the male coupler ends may selectively be mated with one of the female coupler ends or one of the wells in the base support such that a support structure is defined extending upwardly from the base support. A plurality of gripping members may be used for selectively gripping a toy. Each of the plurality of gripping members has a male coupler attached thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
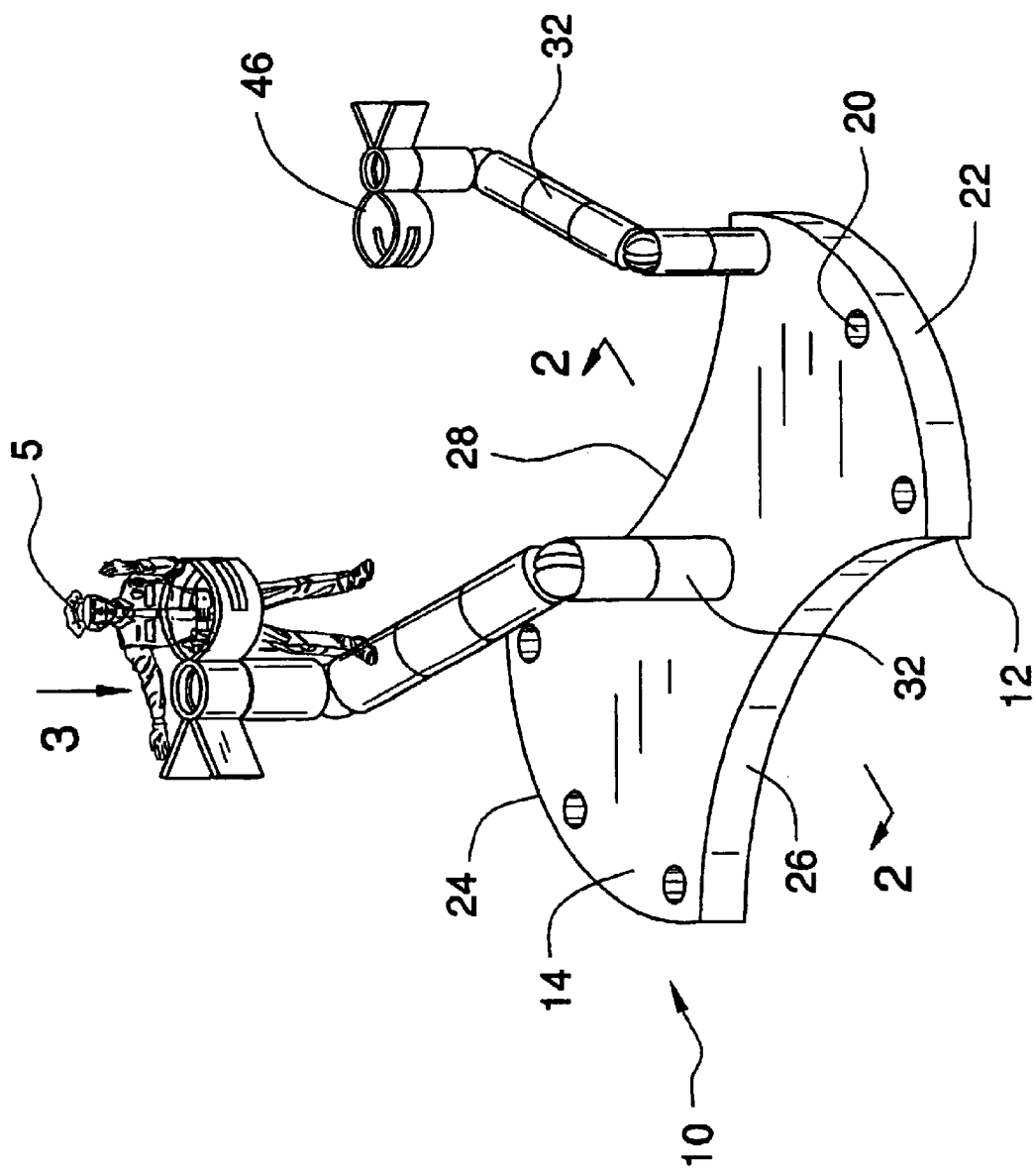
FIG. 1 is a schematic perspective view of a toy support apparatus according to the present invention.
Figure 2:
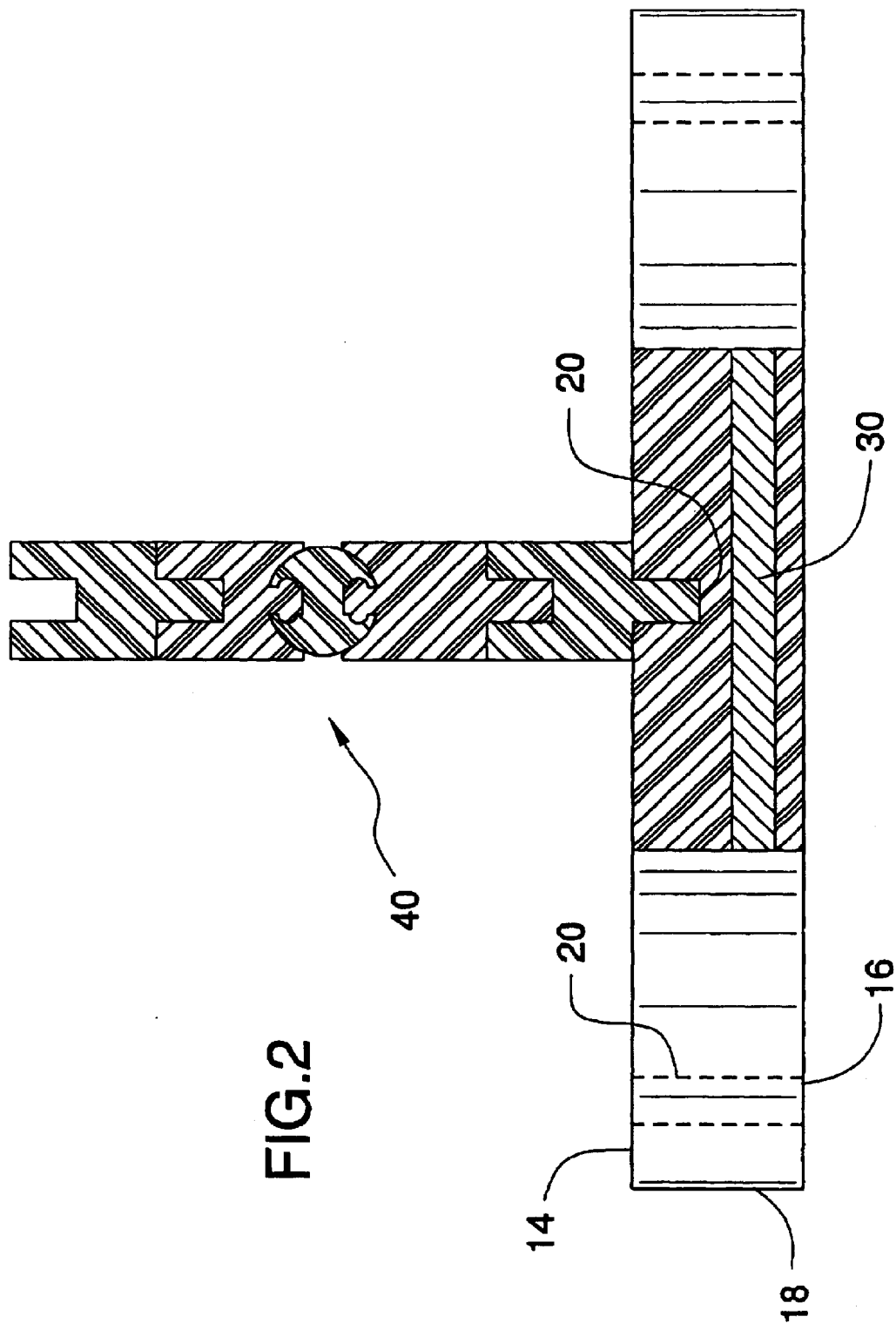
FIG. 2 is a schematic cross-sectional view taken along line 2—2 of FIG. 1 of the present invention.
Figure 3:
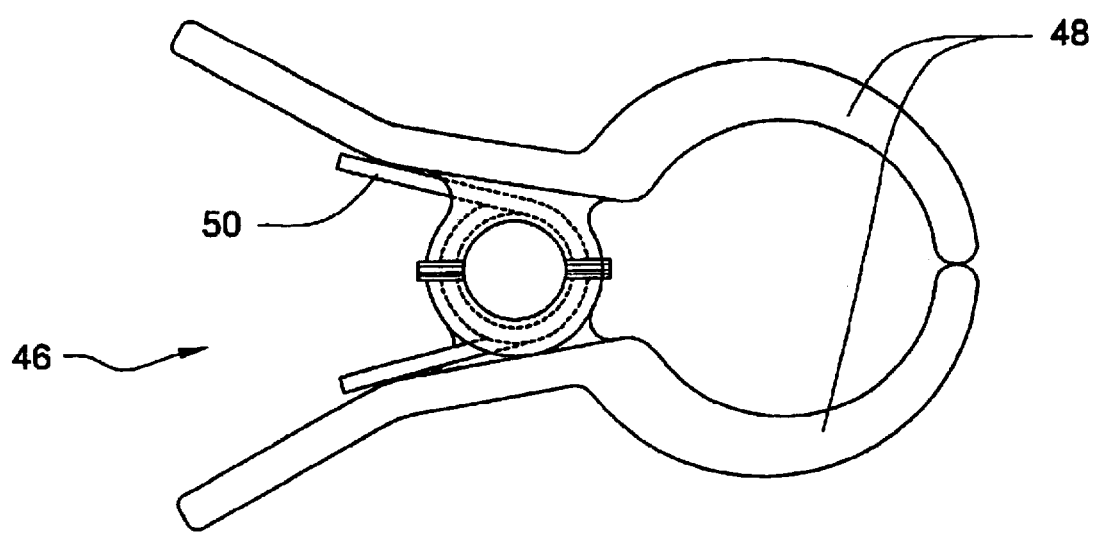
FIG. 3 is a schematic top view of a gripping member of the present invention.
Figure 4:
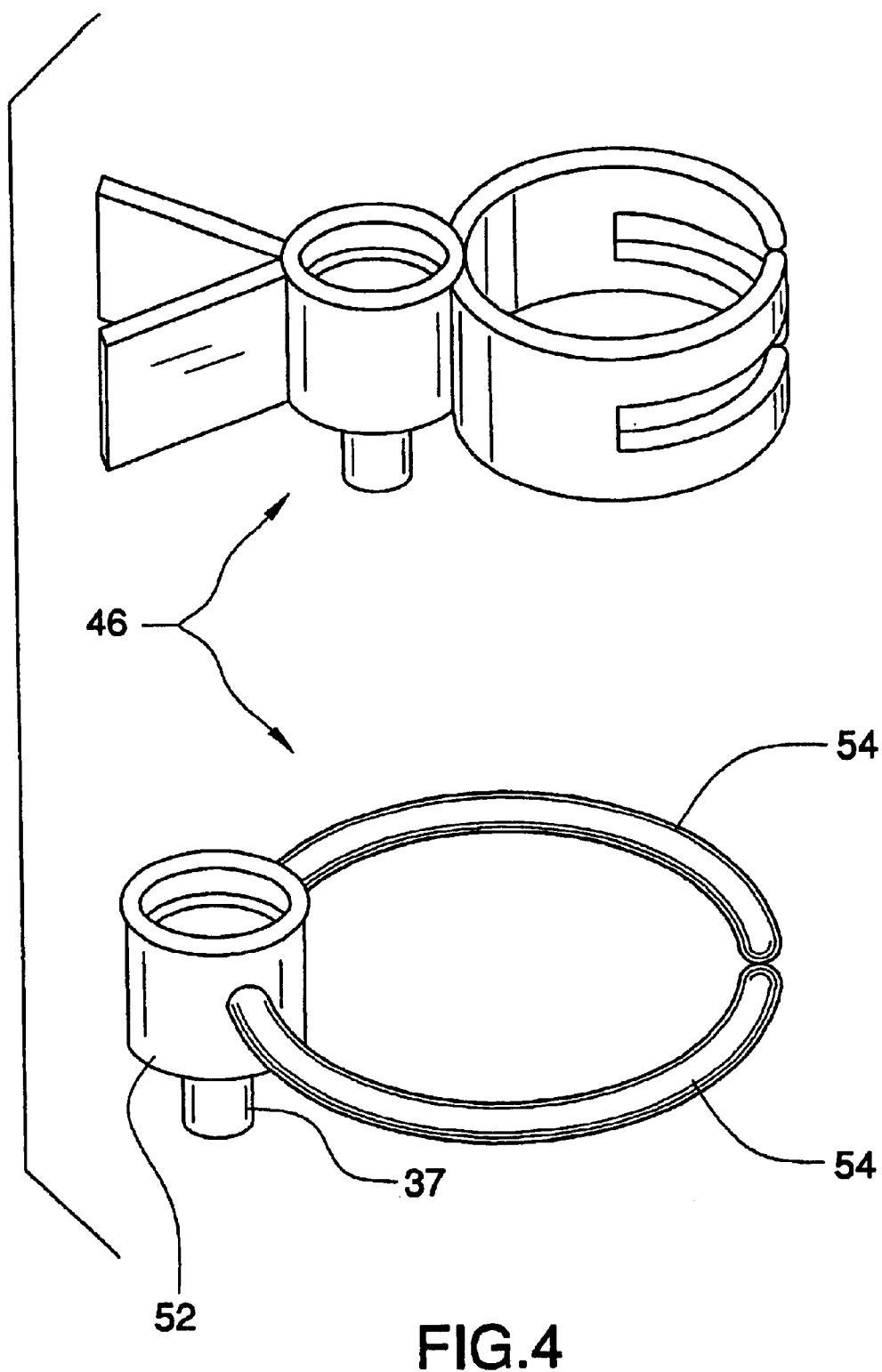
FIG. 4 is a schematic perspective view of two embodiments of the gripping members of the present invention.
Figure 5:
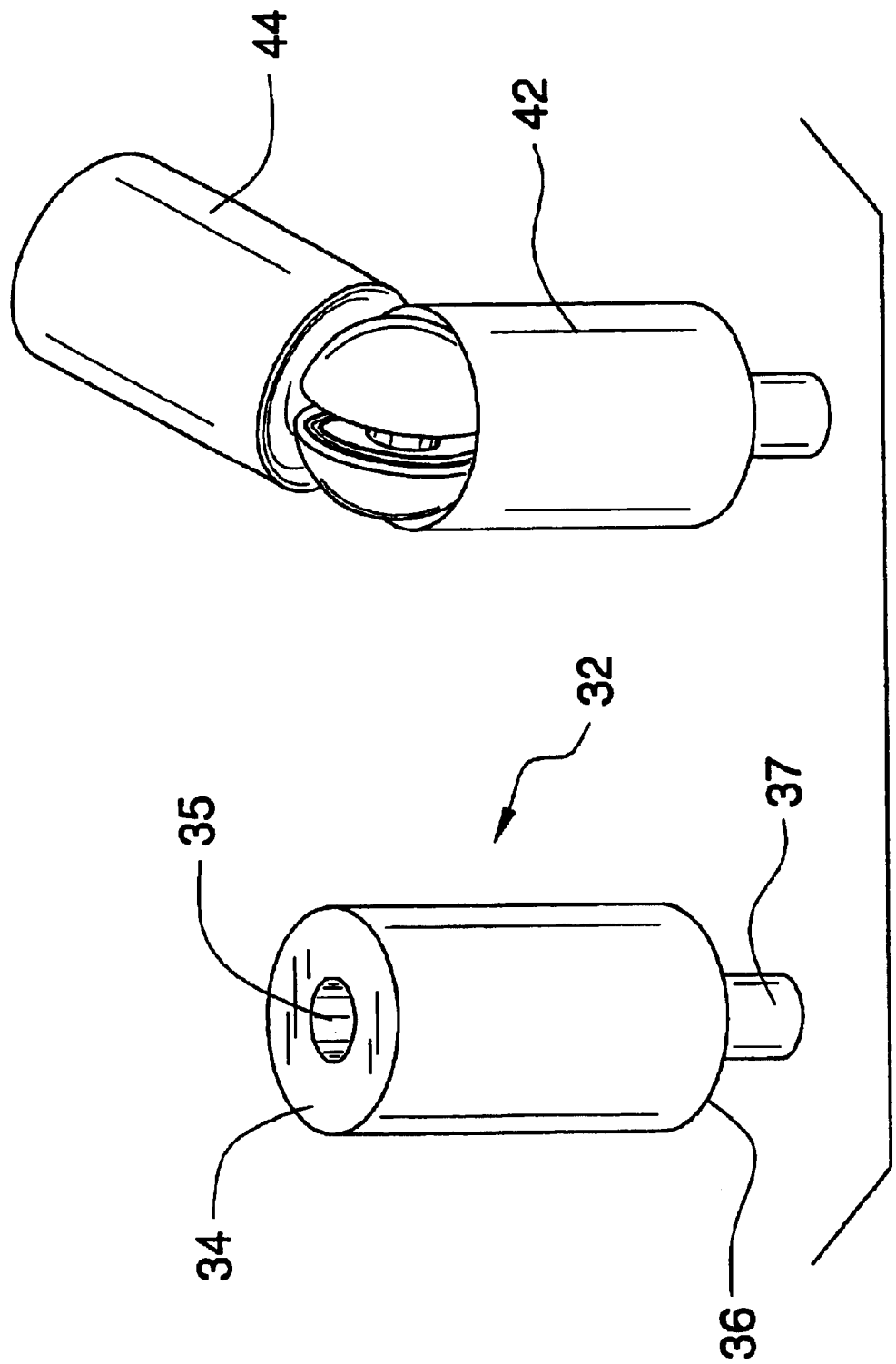
FIG. 5 is a schematic perspective view of the vertical supports of the present invention.
Figure 6:
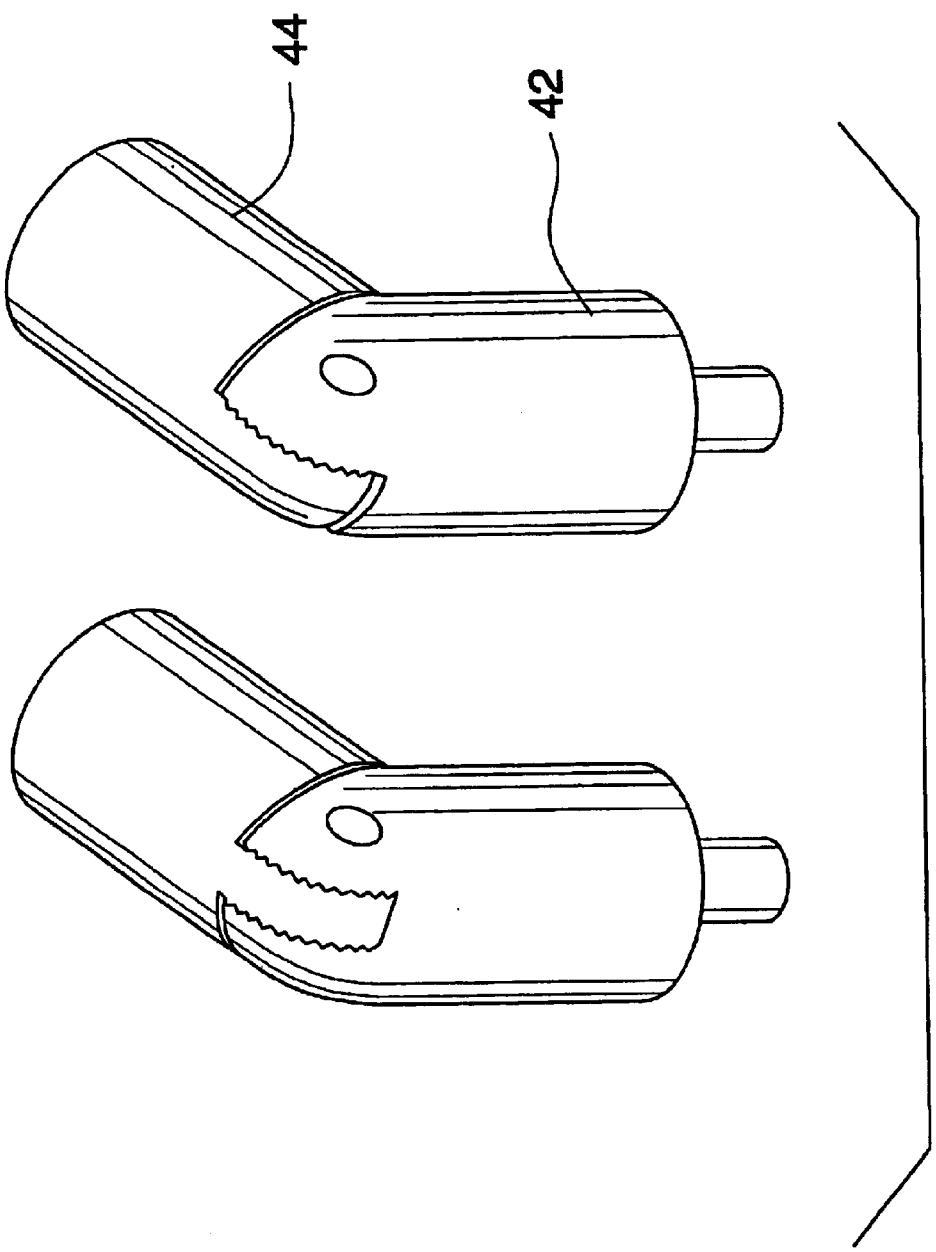
FIG. 6 is a schematic perspective view of vertical supports of the present invention.

With reference now to the drawings, and in particular to FIGS. 1 through 6 thereof, a new doll and toy support device embodying the principles and concepts of the present invention and generally designated by the reference numeral 10 will be described.

As best illustrated in FIGS. 1 through 6, the toy support apparatus 10 generally comprises a base support 12 having a top surface 14, a bottom surface 16, and a peripheral edge 18 extending between the top 14 and bottom 16 surfaces. The top surface 14 has a plurality of wells 20 extending therein. At least one of the wells 20 is centrally positioned on the top surface 14. Some or all of the wells 20 may extend through the base support such that fasteners, such as conventional bolts or screws, may be extended through the base support 12 to attach it to a table surface. The peripheral edge 18 includes a first end edge 22, a second end edge 24, a first side edge 26 and a second side edge 28. Each of three of the plurality of wells 20 is preferably positioned adjacent to one of the first 22 and second 24 end edges. The first 22 and second 24 end edges have a convex shape and the first 26 and second 28 side edges each has a concave shape to give the base support 12 additional stability. Preferably, a weight is positioned in the base support 12 to also give additional stability. The weight 30 is ideally a metal plate positioned within and oriented co-planar with the base support 12.

The apparatus includes a plurality of vertical supports 32. Each of the vertical supports 32 has a female coupler end 34 and a male coupler end 36. The male coupler ends 36 include a male coupler 37 comprising a peg and the female coupler ends 34 include a female coupler 35 comprising an aperture having a size and shape for receiving the pegs. Each of the male coupler ends 36 may selectively be mated with one of the female coupler ends 34. Also, the male coupler ends 36 may be mated with one of the wells 20 in the base support 12 such that a support structure 40 is defined extending upwardly from the base support 12. At least one, and preferably a plurality, of the vertical supports 32 includes a first section 42 and a second section 44 pivotally coupled to each other. Each of the vertical supports 32 preferably has a generally cylindrical shape. Each of the vertical supports 32 preferably has a height between 1 inch and 3 inches and the vertical supports may come in various sizes and widths so that different sized support structures 40 are created.

A plurality of gripping members 46 is used for selectively gripping a toy 5 or accessories therefore. Each of the plurality of gripping members 46 has a male coupler 48 attached thereto which may be extended into one of the female couplers 35. The gripping member 46 may include clamps 48 having springs 50 therein for keeping the clamps 48 in a closed position or flexible gripping arms 54 which extend outwardly from a central post 52.

In use, the user of the apparatus 10 builds a support structure 40 to their needs by adding or removing vertical supports 32. The support structure 40 may be contorted to a desired shape by the use of the vertical supports 32 that include pivoting sections 42, 44. Once the support structure 40 is completed, the toy 5, such as a doll or action figure, may be attached thereto with a gripping member 46. Additional support structures 40 may be added, as needed, to include additional toys or other accessories.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modular support apparatus for toys and their accessories, said support apparatus comprising:
    a base support having a top surface, a bottom surface, and a peripheral edge extending between said top and bottom surfaces, said top surface having a plurality of wells extending therein;
    a plurality of vertical supports, each of said vertical supports having a female coupler end and a male coupler end, wherein each of said male coupler ends may selectively be mated with one of said female coupler ends or one of said wells in said base support such that a support structure is defined extending upwardly from said base support; and
    a plurality of gripping members for selectively gripping a toy, each of said plurality of gripping members having a male coupler attached thereto.

2. The modular support apparatus for claim 1, wherein at least one of said wells is centrally positioned on said top surface.

3. The modular support apparatus for claim 1, wherein said peripheral edge includes a first end edge, a second end edge, a first side edge and a second side edge, each of three of said plurality of wells being positioned adjacent to one of said first and second end edges.

4. The modular support apparatus for claim 3, said first and second end edges having a convex shape, said first and second side edges having a concave shape.

5. The modular support apparatus for claim 1, further including a weight being positioned in said base support.

6. The modular support apparatus for claim 5, said weight comprising a metal plate positioned within said base support.

7. The modular support apparatus for claim 5, wherein at least one of said vertical supports includes a first section and a second section pivotally coupled to each other.

8. The modular support apparatus for claim 1, wherein at least one of said vertical supports includes a first section and a second section pivotally coupled to each other.

9. The modular support apparatus for claim 7, wherein each of said vertical supports having a generally cylindrical shape.

10. A modular support apparatus for toys and their accessories, said support apparatus comprising:
    a base support having a top surface, a bottom surface, and a peripheral edge extending between said top and bottom surfaces, said top surface having a plurality of wells extending therein, at least one of said wells being centrally positioned on said top surface, said peripheral edge including a first end edge, a second end edge, a first side edge and a second side edge, each of three of said plurality of wells being positioned adjacent to one of said first and second end edges, said first and second end edges having a convex shape, said first and second side edges having a concave shape;
    a weight being positioned in said base support;
    a plurality of vertical supports, each of said vertical supports having a female coupler end and a male coupler end, wherein each of said male coupler ends may selectively be mated with one of said female coupler ends or one of said wells in said base support such that a support structure is defined extending upwardly from said base support, at least one of said vertical supports including a first section and a second section pivotally coupled to each other, each of said vertical supports having a generally cylindrical shape; and
    a plurality of gripping members for selectively gripping a toy, each of said plurality of gripping members having a male coupler attached thereto.

* * * * *